Sept. 30, 1924.
H. MICHELSEN
AVOCADO PICKING BAG
Filed Dec. 18, 1923
1,509,972
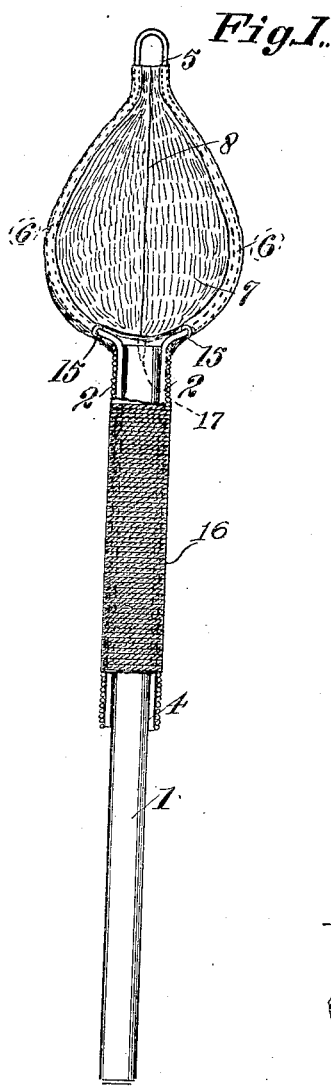
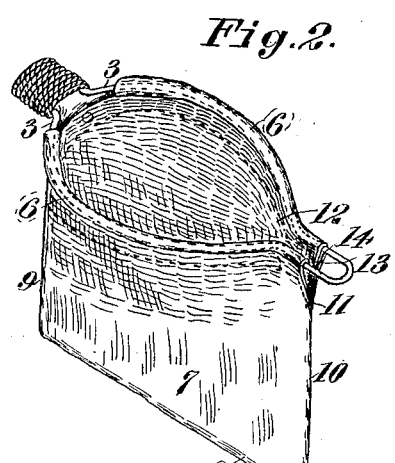
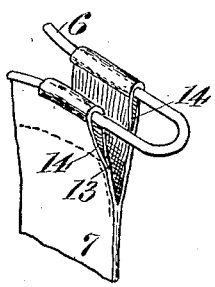
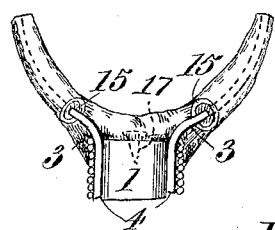
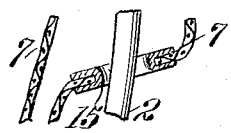
Inventor.
Hamilton Michelsen.
By Ackley Totten
Attorneys.

Patented Sept. 30, 1924.

1,509,972

UNITED STATES PATENT OFFICE.

HAMILTON MICHELSEN, OF MIAMI, FLORIDA.

AVOCADO-PICKING BAG.

Application filed December 18, 1923. Serial No. 681,344.

*To all whom it may concern:*

Be it known that I, HAMILTON MICHELSEN, a citizen of the United States, residing at Miami, in the county of Dade and State of Florida, have invented certain new and useful Improvements in Avocado-Picking Bags, of which the following is a specification.

Fruit picking bags as at present manufactured consist of a frame on a handle, and to the frame is sewed a bag, the bag being fixed on the frame as a part thereof. The present invention relates to a fruit picking apparatus wherein the frame and bag are so constructed that the same may be fastened one independently of the other and assembled by the user.

The principal object of the present invention is to materially reduce the cost of manufacture of bags, enabling them to be made independently of the frame by a bag manufacturing establishment. Another object of the invention is to provide a frame and bag structure adapted for co-operation when it is desired to mount the bag on the frame, and to provide a fruit picking apparatus whereby the picker is enabled to pick fruit from great heights and from places close to the trunk of a tree without injuring the branches.

The invention consists primarily in a bowed frame to be secured to a pole, and a bag, the edges of which at opposite sides of the mouth are hemmed for reception of the frame members, and the forward seamed edge of the bag being slit downwardly from the mouth to admit of the bag being drawn longitudinally of the frame members.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Fig. 1 is a view in plan partly in section of the preferred embodiment of my invention.

Fig. 2 is a view in perspective of the bag and frame disclosing particularly the opening at the forward edge of the bag extending downwardly from its mouth.

Fig. 3 is an enlarged view of the forward end of the bag and frame disclosing the opening extending downwardly from the bag mouth at the forward edge of the frame.

Fig. 4 is a plan view in detail partly in section, illustrating the manner of securing the rear end of the bag to the end of the pole.

Figure 5 is a transverse sectional view through one of the grommets illustrating the frame rod passing therethrough.

Referring more particularly to the several views of the drawings wherein like characters of reference designate corresponding parts, 1 indicates a pole serving as a handle and the same is of any desired length. The pole mounts a bag frame 2 consisting preferably of a single wire bent midway of its length to provide frame side members 3, disposed in the same plane. The terminal of the frame forming wires at the inner end of the frame lies in parallel relation, as at 4, and the outer end of the frame is provided with a relatively narrow throat 5, that portion of the frame intermediate the throat 5 and terminal end portions 4 being bowed as at 6. While the frame is illustrated as having outwardly bowed portions 6, this portion may be circular or any degree of oval in plan. On the frame I mount a suitable bag 7, the same being formed preferably of a single sheet of material folded in half on its lower line 8, and the opposite edges of which are stitched respectively as at 9 and 10. The stitching 10 terminates at a point 11 short of the upper open mouth 12 of the bag. At opposite sides of the mouth the bag walls are hemmed as at 13 providing open ended tubular channels 14, one for receiving each of the side frame members 6, and the distance between the terminus of the stitching 10 and the upper end of the bag is such as to provide on the forward edge of the bag two non-secured side wall members of a combined length equal to the maximum distance across the frame at its point of greatest bulge. At their rear ends the channels 14 are surrounded by grommets 15 for protecting the material.

The frames and bags being separately formed, the same are assembled in the following manner:—

The operator grasps the frame 2 and inserts the terminal ends 4 thereof into the guides 14 from the forward end 10 of the bag. With one terminal end 4 within each guide 14 the bag is moved longitudinally of the frame and is gradually worked along the same, and around the bowed portion thereof, the unsecured forward end of the bag permitting it being fed longitudinally of the frame without tearing. On the bag reaching a point where the rear end thereof approaches the grommets 15 on the frame, the terminal end members 4 are disposed one on each side of the pole 1, and are secured to the pole in any suitable manner as by a wrapping 16. To prevent the rear end of the bag from creeping upwardly along the frame, it has been found advisable to pass the member 17 therethrough preferably in the form of a screw, and force the same into engagement with the end of the handle, as in Fig. 1 of the drawings.

It will be observed that this construction, by enabling the bags to be manufactured at one point, preferably at a bag factory, and the frames at another point, preferably at a wire works, it is possible to ship the apparatus in a knockdown condition to be assembled by the rancher, and that the construction of the bags and frames in the respective factories and the shipping of the same in a condition for ready assembly will materially reduce the cost of the apparatus over devices for a similar apparatus which require considerable time and the use of special devices for assembling the same.

Having thus described my invention, what I claim as new and desire to protect by Letters Patent of the United States is:—

1. A fruit picking apparatus including a single piece of material bent to provide an open bag mounting frame comprising opposing side members and terminal ends lying in parallel relation opposite to each other, one end of the frame having a relatively narrow throat, the opposing frame side members intermediate the throat and terminal ends being outwardly curved, a bag provided with a mouth, the free edges of said bag mouth being each formed with an open ended frame receiving recess, one end of said bag being opened downwardly from the mouth to permit the bag to be positioned on the frame by longitudinal movement of one of the frame members through each of the frame receiving recesses, and a handle to which the terminal ends of the frame are secured.

2. A fruit picking apparatus including a wire bent to provide opposing side members outwardly curved to forward a frame having a substantially oval mouth portion, the terminal ends of said wire being bent to lie in parallel relation, a bag depending from the frame and provided with an open mouth, the opposite edges of the mouth being hemmed to provide tubular guides through each of which one side frame wire is inserted, the outer end of said bag being opened downwardly from the mouth providing unsecured portions of a combined length corresponding to the distance between the frame members at their farthest point of separation, a pole, means for securing the frame to the pole, and means for securing the inner end of the bag to the pole.

In testimony whereof I have signed my name to this specification.

HAMILTON MICHELSEN.